United States Patent [19]

Geppert

[11] Patent Number: 4,533,793

[45] Date of Patent: Aug. 6, 1985

[54] WALL EXCHANGE

[75] Inventor: Fritz Geppert, Ober-Moerlen, Fed. Rep. of Germany

[73] Assignee: Telefonbau und Normalzeit GmbH, Frankfurt, Fed. Rep. of Germany

[21] Appl. No.: 436,779

[22] Filed: Oct. 26, 1982

[51] Int. Cl.³ .............................................. H04M 1/00
[52] U.S. Cl. .................................. 179/99 R; 179/178; 179/98; 361/415
[58] Field of Search .................. 179/99 R, 100 C, 178, 179/179, 98, 91 R, 146 R, 91 A; 361/427, 415, 399, 395, 426

[56] References Cited

FOREIGN PATENT DOCUMENTS 2846825  5/1980  Fed. Rep. of Germany ........ 179/98

*Primary Examiner*—Stafford D. Schreyer
*Attorney, Agent, or Firm*—Jacobson & Johnson

[57] ABSTRACT

A wall exchange for a telephone system having a baseplate affixed to a supporting wall in which the various component parts are attached to one another and to the baseplate by molded snap-in connectors.

6 Claims, 3 Drawing Figures

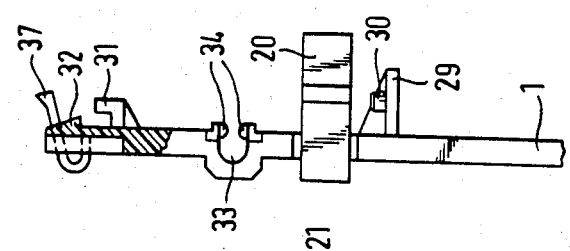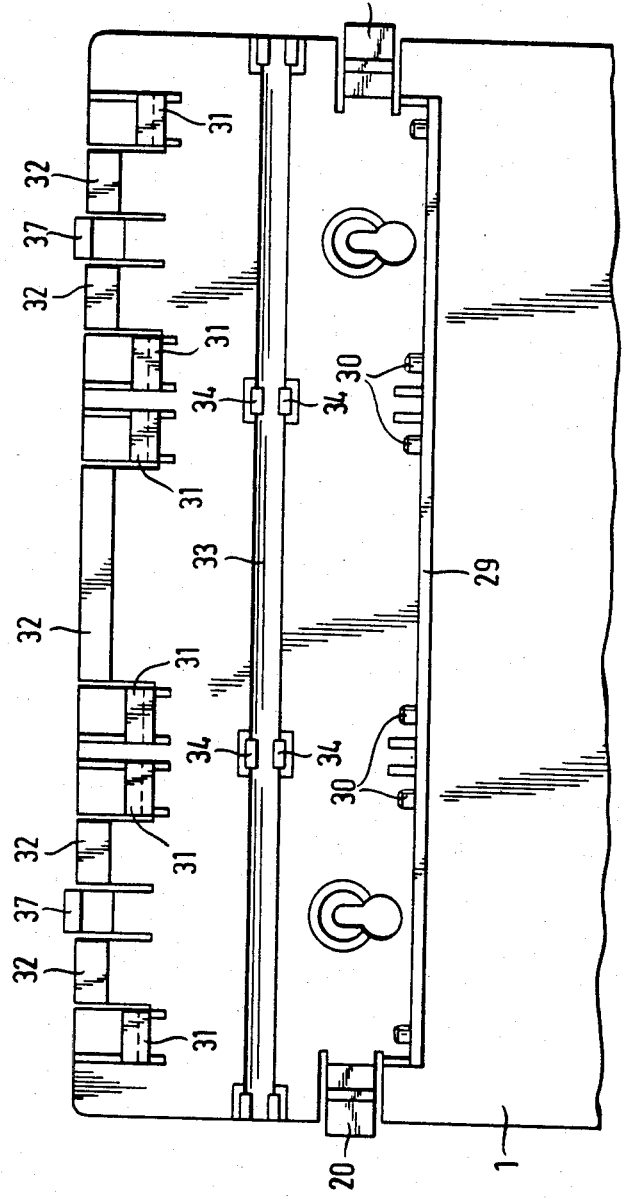

WALL EXCHANGE

BACKGROUND OF THE INVENTION

The invention concerns a wall exchange for telephone systems, particularly key systems, in which a baseplate is fixed to a support wall and in the lower portion of said baseplate are connecting strips with multiple contact strips pointing upwards. In addition, there is a component holder having on its backside a wiring card fitted with multiple plugs in its lower end, and in which the component holder is mounted with the wiring card multiple plugs inserted into the multiple contact strips in a slanted forward direction and by swinging the component holder toward the wall it is locked together with the baseplate.

SUMMARY OF THE INVENTION

In a wall exchange for telephone systems, particularly key systems, a baseplate is fixed to a supporting wall and in its lower portion has connecting strips with multiple contact strips pointing upwards. A component holder has on its backside a wiring card which has multiple plugs in its lower portion. The component holder is mounted by inserting the multiple plugs into the multiple contact strips and then swinging it into locking engagement with the baseplate. In assembling a wall exchange of this type the individual component parts such as power supplies, connecting strips, component holder, and housing cover can be made economically out of plastic and can be economically mounted to a plastic baseplate by means of simple snap-in connections.

The object of the invention is to provide a wall exchange of the type mentioned above wherein the individual component parts can be produced and mounted in simple and economical ways.

According to this, the exchange comprises a few uncomplicated and low-priced plastic parts which are linked to one another simply and quickly by means of molded snap-in connections. As a further feature there are provided simple and economical means for mounting and attaching the individual component parts.

DESCRIPTION OF THE DRAWING

The invention will be described in more detail, with reference to the accompanying drawings, wherein

FIG. 2 is a front view of the upper part of the baseplate used in the wall exchange of FIG. 1; and FIG. 3 is a partially sectioned side view of FIG. 2.

DESCRIPTION OF THE PREFERRED EMBODIMENT

Figure 1:
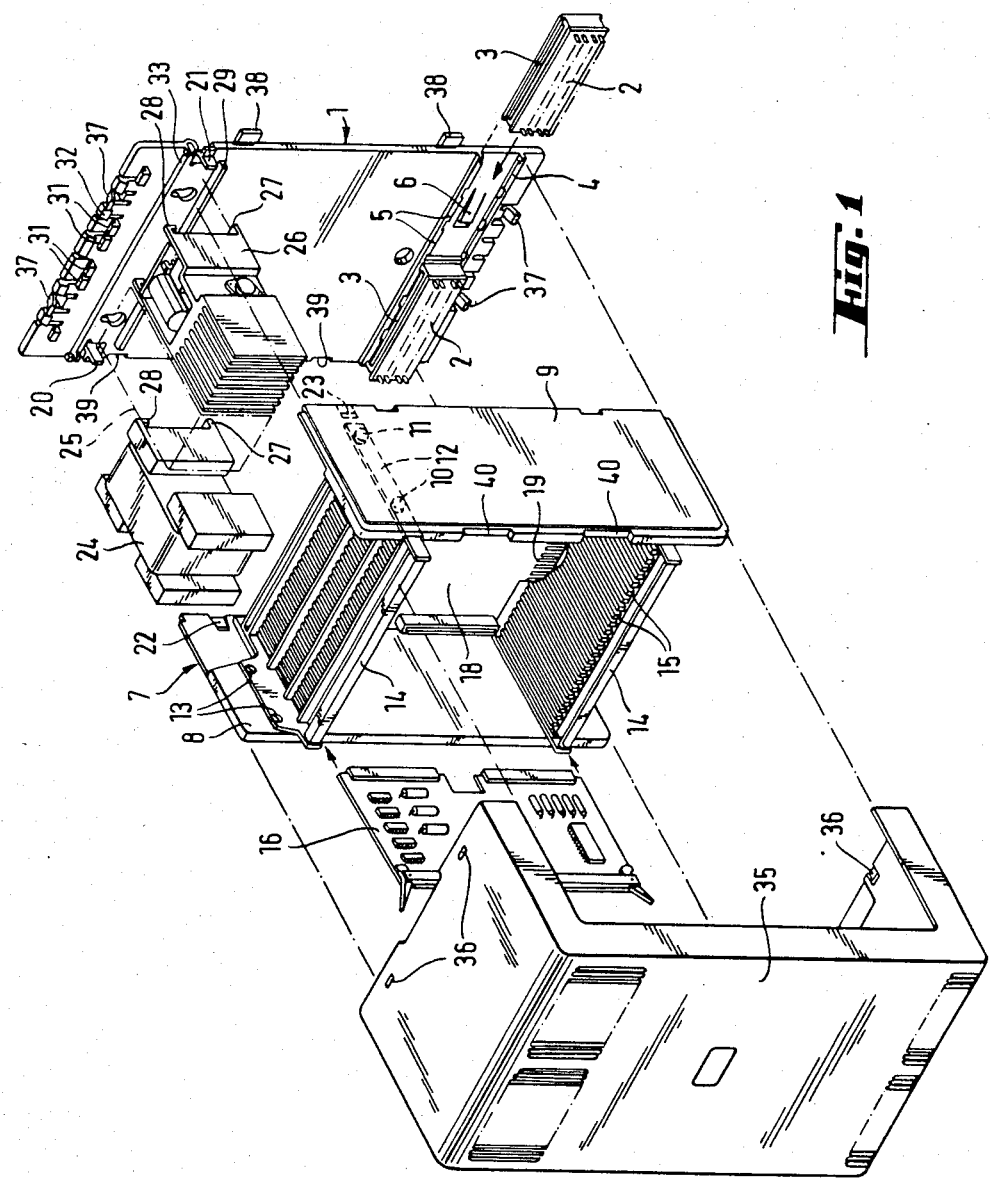
FIG. 1 is a perspective, exploded blow-apart view of a wall exchange constructed according to the teachings of this invention.

The wall exchange shown in FIGS. 1-3 for telephone systems features a plastic baseplate 1 which is fixed in some suitable fashion to a wall (not shown). In the lower portion of the baseplate 1 are connecting strips 2 fitted with multiple contact strips 3 pointing upwards. For mounting purposes, the baseplate is provided with guides 4 and 5 into which the connecting strips 2 are laterally inserted. Moreover, snap-in springs 6 are molded onto the baseplate so that when the connecting strips 2 are slipped into guides 4 and 5 the springs 6 catch into openings (not shown) provided in the connecting strips 2.

A component holder 7 has plastic side walls 8 and 9 interconnected by plastic frames 14. The plastic edges of frames 14 frictionally grip pegs 10 an 11 in groove 12 on the inner surface of the side walls 8 and 9 and are fastened to the side walls 8 and 9 with self-tapping screws 13. The frames 14 are provided with guides 15 to receive slide-in circuit cards 16. The backside of the component holder 7 has a wiring card 18 which is inserted in slots (not shown) of the side walls 8 and 9 and which has its lower end 19 fitted out as a multiple-plug arrangement.

For mounting, the multiple plugs 19 at the bottom of wiring card 18 of component holder 7 are inserted into the multiple contact strips 3 in a slanted way and then is locked to baseplate 1 by swinging the upper part of component holder 7 toward the baseplate.

For locking, snap-in hooks 20 and 21 are fitted to the upper portion of baseplate 1 close to the lateral edges, and cut-outs 22, 23 are provided in the internal side walls 8, 9 of the component holder 7 in such a way that when the component holder 7 is swung to the baseplate 1, the snap-in hooks 20, 21 catch into the cut-outs 22 and 23.

A power supply section is installed in the upper portion of the baseplate 1 before or after fixing the component holder 7. In the embodiment under consideration the power supply portion consists of three modules 24, 25 and 26, each of which has a plastic part with bendings 27 and 28 for hooking onto the baseplate 1.

FIGS. 2 and 3 show an enlarged upper portion of the baseplate 1. As can be seen especially from these figures, a strip 29 with mounting eyelets 30 and mounting hooks 31 is molded to the baseplate 1. Each power supply module is attached to the baseplate from above in such a way that the mounting eyelets 30 on the strip 29 catch into the corresponding openings of the bending 27 and the bendings 28 catch behind the mounting hooks 31. In addition, snap-in springs 32 are molded to the baseplate 1 with the springs 32 push outwards, thus holding the modules in their proper positions.

In addition, the baseplate 1 includes a cable duct 33 with springs 34 to hold the cable in the duct.

The wall exchange is closed on the front side by means of a plastic cover 35 provided with cut-outs 36. When cover 35 is put on, the snap-in springs 37 molded to the lower part of baseplate 1 catch into cut-outs 36, holding the housing cover 35 through this snap-in connection.

For the purpose of arraying the wall exchanges one beside another, guider tabs 38 are provided on one side and corresponding cut-outs 39 on the other of the baseplate 1. The electrical interconnection of wall exchanges arranged one beside another is established by means of flat cables running between the side walls 8 or 9 and the housing cover 35, for which purpose the side walls 8 or 9 are provided with cut-outs 40.

I claim:

1. In a wall exchange for telephone systems, particularly key systems, in which a baseplate (1) is fixed to a wall and in the lower portion of said baseplate are connecting strips (3) with multiple contact strips pointing upwards, and having a component holder (7) which has on its backside a wiring card (18) which in its lower end has multiple-plug connectors (19) whereby the component holder is mounted with the multiple-plug connector inserted into the multiple contact strips in a slanted forward direction and, by swinging toward the wall, is attached to the baseplate and further having power supply modules (24, 25, 26) and a housing cover (35), the improvement comprising: each of said power supply modules, component holder, cover and baseplate being made of plastic and including means on said baseplate and on said modules, component holder and cover for making snap-in locking engagement between each of said modules, component holder and cover and said baseplate.

2. In a wall exchange for telephone systems, particularly key systems, having a plastic baseplate (1) fixed to a supporting wall; connecting strips (2) having multiple contact strips (3); lateral guide means (4, 5) on the lower portion of said baseplate (1) for slidably receiving and holding said connecting strips (2); and snap-in spring means (6) molded to said baseplate for holding said contact strips in place when inserted into said guide means (4, 5).

3. In a wall exchange as described in claim 2, further including: power supply modules (24, 25, 26) made of plastic having lower bend extensions (27) and upper bend extensions (28); a strip (29) on the baseplate (1) with mounting eyelets (30) releasably engaging said lower extensions (27); and hooks (31) on said baseplate (1) for releasably engaging said upper bend extensions (28).

4. A wall exchange as described in claim 3 further including snap-in springs (32) on said baseplate (1) for applying a holding force on the power supply modules when said eyelets (30) and said hooks (31) are respectively engaging said extensions (27, 28).

5. A wall exchange as in claim 2 further including:
a plastic component holder (7) having on its backside a wiring card (18) with multiple plugs (19) at its lower end for electrically contacting multiple contact strips (3) when said connecting strips (2) are located in said guide means (4, 5);
cutouts (22, 23) on the side walls of said component holder; and
snap-in hooks (20, 21) on the baseplate for respectively lockingly engaging said cutouts (22, 23) for releasably attaching said component holder to said baseplate.

6. A wall exchange as in claim 2 further including:
a plastic housing cover (35) having cutouts (36); and
snap-in springs (37) molded to said baseplate for lockingly engaging said cutouts (36) for releasably attaching said cover to said baseplate.

* * * * *